June 20, 1967 S. GODEL 3,327,278
ELECTRICAL INTERCONNECTING DEVICES
Filed Sept. 23, 1964 7 Sheets-Sheet 1
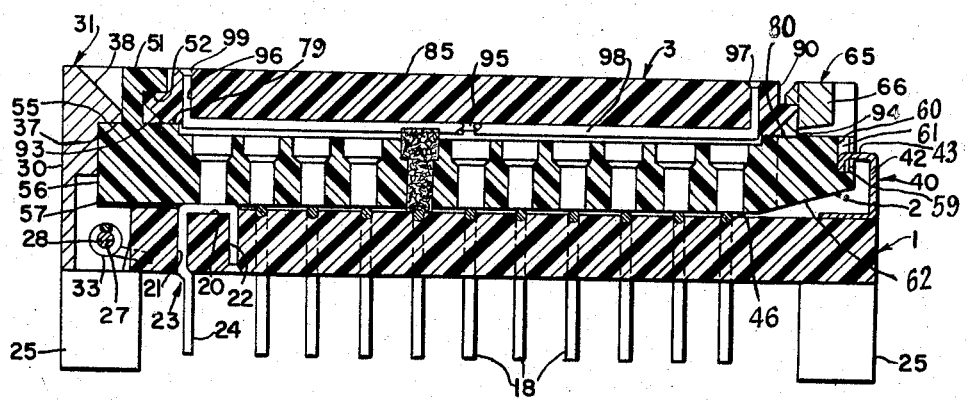
FIG.1.
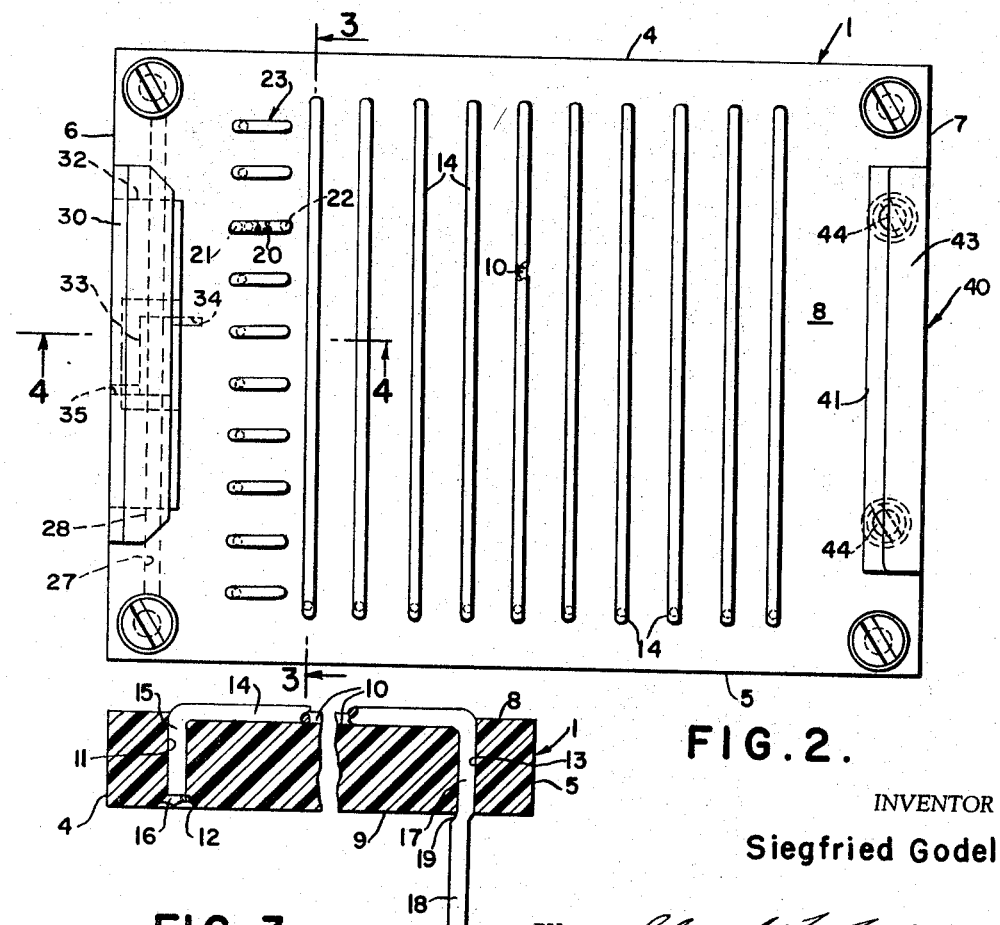
FIG.2.
FIG.3.
INVENTOR
Siegfried Godel
BY
ATTORNEY June 20, 1967  S. GODEL  3,327,278
ELECTRICAL INTERCONNECTING DEVICES
Filed Sept. 23, 1964  7 Sheets-Sheet 2
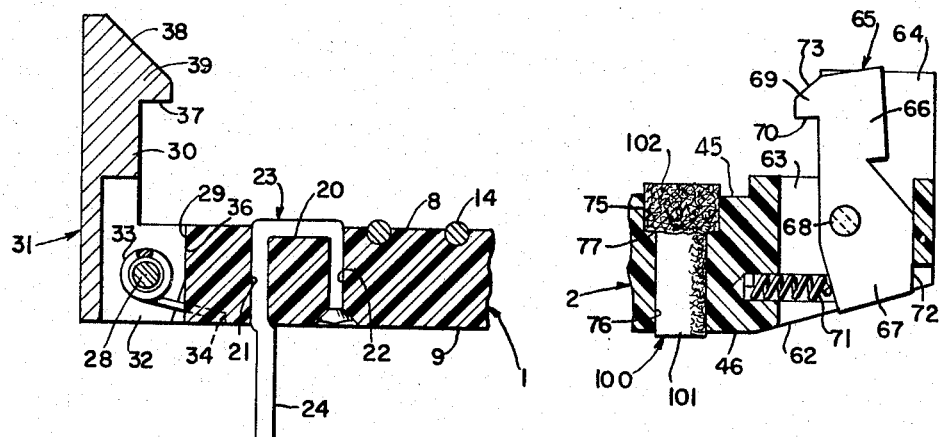
FIG. 4.
FIG. 6.
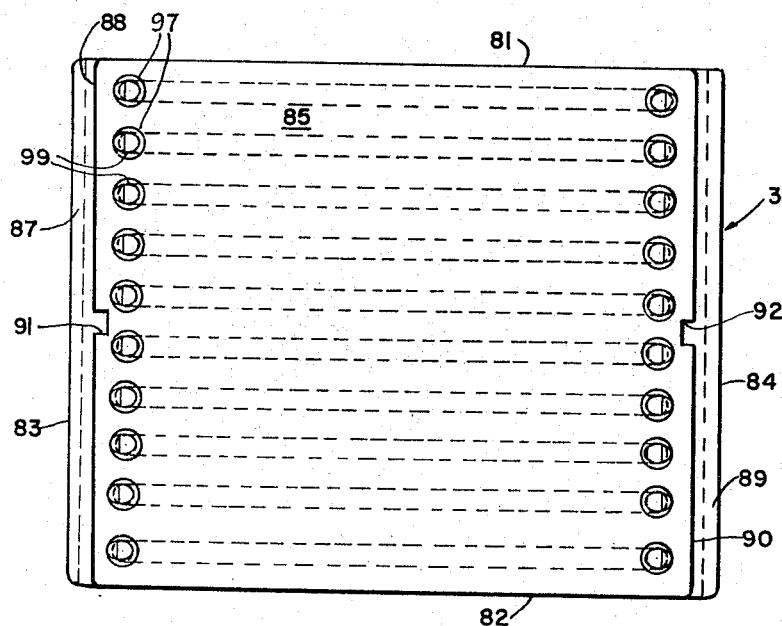
FIG. 8.
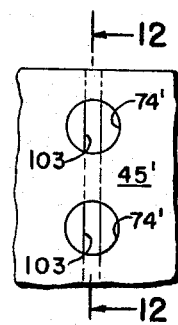
FIG. 11.
INVENTOR
Siegfried Godel
BY
ATTORNEY June 20, 1967  S. GODEL  3,327,278
ELECTRICAL INTERCONNECTING DEVICES
Filed Sept. 23, 1964  7 Sheets-Sheet 4

INVENTOR
Siegfried Godel

BY *Stewart F. Moore*

ATTORNEY

June 20, 1967 S. GODEL 3,327,278
ELECTRICAL INTERCONNECTING DEVICES
Filed Sept. 23, 1964 7 Sheets-Sheet 5

INVENTOR
Siegfried Godel

BY
ATTORNEY

INVENTOR
Siegfried Godel

June 20, 1967 S. GODEL 3,327,278
ELECTRICAL INTERCONNECTING DEVICES
Filed Sept. 23, 1964 7 Sheets-Sheet 7

INVENTOR
Siegfried Godel

BY *Stewart F. Moore*
ATTORNEY

United States Patent Office 3,327,278
Patented June 20, 1967

3,327,278
ELECTRICAL INTERCONNECTING DEVICES
Siegfried Godel, Norwalk, Conn., assignor to American Machine & Foundry Company, a corporation of New Jersey
Filed Sept. 23, 1964, Ser. No. 398,532
14 Claims. (Cl. 339—18)

This invention relates to electrical interconnecting devices and particularly to devices of the type which are commonly referred to as pinboards, plugboards, and cross-connecting devices. Though of broader application, the invention has special advantages when employed in a matrix configuration.

Electrical interconnecting devices of the type referred to have long been known and are widely used in connection with the programming of computers, machine tools and test equipment, electrical control systems for automatic machinery of various types, and the construction of "breadboard" and prototype assemblies. Despite commercial acceptance, however, prior-art devices of this general type have presented a number of disadvantages and shortcomings. Thus, such devices have been unduly complicated and expensive, have been so constructed that manual programming or selection of the connections to be made could not be accomplished easily, have frequently had excessive resistance at the cross-connections, have been characterized by unduly short operating life because of sliding engagement between electrically conductive parts and because of the use of intricate and fragile components, and have not provided wide flexibility of use, the products frequently being more or less "tailor-made" to fit the purchaser's requirements.

A general object of this invention is accordingly to devise an improved electrical interconnecting device free from such disadvantages.

Another object is to provide a device of the type described which includes two members carrying conductive elements to be interconnected, and a third member in the nature of a programming board, the device being so constructed that the programming board can be removed and replaced easily and without involving sliding engagement between electrically conductive parts of the device.

A further object is to devise a unit of the type described wherein the selected points of interconnection can be checked by visual observation when the unit has been programmed and completely assembled.

Another object is to provide such a device, including a removable programming board, wherein all of the permanently connected electrical leads are connected to a base member, and elements other than the base member can be removed and taken away from the point of installation without disturbing the leads.

Yet another object is to provide an easily programmable cross-connecting device which does not include fragile or intricate parts, constitutes a rigid unit when assembled, and can be manufactured at relatively low cost.

A still further object is to provide such a device characterized by low resistance at the selected interconnections.

Considered broadly, electrical interconnecting devices in accordance with the invention include an insulating base which can be permanently mounted on or in the equipment with which the device is to be used, an intermediate insulating member or programming board, and an upper insulating member, the intermediate and upper members being removably mounted on the base, the conductive elements to be interconnected being carried by the base and upper member, and interconnection being accomplished by means of connector pins inserted in apertures in the intermediate member. The construction is such that the intermediate member can be removed and replaced manually in a very simple fashion without requiring such relative movements between the parts as would cause frictional sliding engagement between the connector pins and the conductive elements, the intermediate member being removed in toto, while still positively retaining the connector pins, when the device is to be re-programmed. In the most advantageous embodiments of the invention, the upper member is transparent, so that the locations of the connector pins in the programming board can be checked visually though the device is in completely assembled condition. No permanently connected leads are required for the conductive elements of the upper member, so that this member can be totally removed, independently or with the intermediate member, and taken freely away from the point of installation of the base during re-programming. Novel and particularly effective connector pins are employed which are held in compression between the base and upper member and positively retained in the apertures of the programming board.

Thus in accordance with the present invention, any number of pairs of the intermediate and upper members may be pre-programmed and stored in assembled relationship to form a collection of programs from which a new program can be quickly selected an inserted in the base, when a change of program is desired.

In order that the manner in which the foregoing and other objects are achieved in accordance with the invention can be understood in detail, particularly advantageous embodiments of the invention will be described with reference to the accompanying drawings, which form part of this specification, and wherein FIG. 1 is a longitudinal cross-sectional view of a cross-connecting matrix pinboard device in accordance with one embodiment of the invention;

FIG. 2 is a top plan view of the base member of the device of FIG. 1;

FIG. 3 is a fragmentary transverse sectional view taken on line 3—3, FIG. 2;

FIG. 4 is a fragmentary sectional view taken on line 4—4, FIG. 2;

FIG. 6 is a fragmentary sectional view taken on line 6—6, FIG. 5;

FIG. 8 is a top plan view of the member shown in FIG. 7;

FIG. 11 is a fragmentary top plan view illustrating a modified form of the member shown in FIG. 5;

Figure 5:
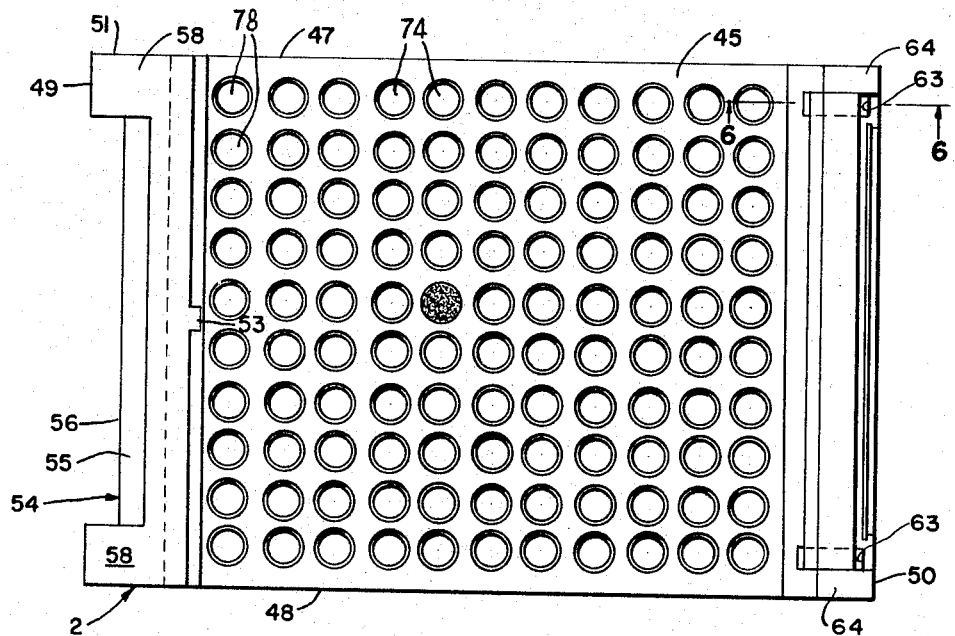
FIG. 5 is a top plan view of the intermediate member of the device of FIG. 1.

The embodiment of the invention illustrated in FIGS. 1–10 comprises a base member indicated generally at 1, a programming board or intermediate member 2, and an upper member 3. It will be understood that the device as illustrated in FIG. 1 can be mounted in any position. However, for simplicity of explanation, member 1 will be considered as the lowermost member and member 3 the uppermost member.

Comparing FIGS. 1 and 2, it will be seen that base 1 is in the form of an integral rectangular plate of synthetic resinous material, advantageously a methyl methacrylate polymer. Base 1 is in the form of an elongated rectangle, having long sides 4 and 5 and short sides 6 and 7. The upper surface 8 and the lower surface 9 of the base are parallel and flat, extending for the full width and length of the base. As best seen by comparing FIGS. 1 and 3, a plurality of straight grooves 10 are provided in the upper surface 8 of base 1, grooves 10 being mutually parallel and parallel to the short sides 6 and 7. Grooves 10 are of equal length and have semi-circular transverse cross sections. At one end of each groove 10, there is provided a through bore 11 which extends at right angles to surfaces 8 and 9 and includes a flared mouth 12 where the bore opens through surface 9. At the other end of each groove 10, base 1 is provided with a through bore 13.

Each groove 10 accommodates the main body portion of an electrically conductive wire 15 having a circular cross section of a diameter substantially equal to the diameter of the semi-circular transverse cross section of the groove. Each wire 14 has an end portion 15 bent at right angles to the main body of the wire and extending through the corresponding bore 11. The tip 16 of portion 15 of the wire is deformed, as during a cutting operation, to engage the flared, frusto-conical mouth portion 12 of bore 11 and thus lock the wire firmly to base 1. At its other end, each wire 14 includes a portion 17, extending through the corresponding bore 13, and a portion 18 which projects below surface 9 as a terminal to which an electrical lead can be connected in any suitable manner, as by soldering. At the juncture between portions 17 and 18, the wire is offset laterally, at 19, to provide a shoulder engaged beneath surface 9 to lock the wire firmly in place. Since portions 15 and 17 are held in tension, by reason of engagement of tip 16 and shoulder 19 with the base, it will be clear that the main body portion of the wire is firmly seated in the groove 10.

In this embodiment, there are ten of the wires 14 and these wires constitute a first group of elongated, mutually parallel, electrically conductive elements secured to base 1 and exposed at the upper face 8 thereof. Since this embodiment is constructed in matrix fashion, the mutually parallel wires 14 can be considered to establish the X axis of the matrix, with this axis extending transversely of the base and parallel to the upper face of the base.

From FIG. 2, it will be noted that the group of wires 14 is offset toward side 7 of the base, so that a substantial portion of surface 8 is left free between the wires 14 and the other side 6 of the base. Within this space, there are provided ten short, mutually parallel, straight grooves 20, FIG. 2, through bores 21 and 22 being provided at the ends of each groove 20. Each groove 20, with its associated bores 21 and 22, accommodates a lead-connection wire indicated generally at 23, FIG. 2, and including an end portion retained in the bore 22, a straight portion seated in the groove 20, a portion extending through groove 21, and a terminal portion 24 projecting below base 1. All of the wires 23 are secured to base 1 in the same fashion hereinbefore described with reference to the wires 14. From FIG. 2, it will be seen that the portions of the wires 23 seated in grooves 20 extend at right angles to the portions of wires 14 seated in grooves 10. Also, the grooves 20 are spaced apart by the same distance as are grooves 10.

To provide for rigid mounting of the unit on the equipment with which the device is to be employed, four stand-off insulators 25 are employed, each being secured to the lower surface of base 1, as by screws 26, FIG. 2.

Adjacent side 6, a cylindrical through bore 27 is provided in base 1, bore 27 extending parallel to side 6 and also parallel to surface 8. Bore 27 accommodates a cylindrical shaft 28, FIGS. 1 and 4. At side 6, base 1 is provided with a rectangular notch 29, FIG. 4, which accommodates the shank 30 of a catch member 31 which is journaled on shaft 28 for pivotal movement about the axis of the shaft. Shank 30 is provided with a pair of spaced ears 32 having aligned bores through which shaft 28 extends, the ears 32 projecting from the shank toward the bottom of notch 29. A torsion spring 33 surrounds shaft 28 between the ears 32, one end of the torsion spring being engaged in a notch 34, FIG. 4, provided in a lower surface of body 1. The other end of spring 33 is engaged in a notch 35, FIG. 9, in the bottom edge of shank 30 of catch member 31. Spring 33 is oriented to resiliently bias the catch member 31 in a clockwise direction, as viewed in FIG. 4. Such action causes edge portions 36 of ears 32 to engage the bottom of notch 29, as seen in FIG. 4, maintaining the catch member 31 in its normal, active position, with the shank of the catch member projecting at right angles to surface 8.

At its end opposite base 1, catch member 31 is provided with a shoulder 37 which is directed toward base 1, and an upwardly and outwardly slanting cam surface 38, the shoulder and cam surface being formed on an inwardly extending thicker portion 39 of the catch member, so that the shoulder 37 faces a point within the confines of the rectangular base member 1.

At side 7, there is rigidly secured to the upper surface of base 1 a stationary catch member 40. Catch member 40 is elongated, extending along side 7, and is of generally channel-shaped cross section, including a horizontal web 41, a vertical web 42, and an upper horizontal web 43, the latter being turned downwardly at its free edge, as seen in FIG. 1. Secured by screws 44, stationary catch member 40 opens toward side 6 and is disposed with the outer surface of web 42 in alignment with side 7. Accordingly, the turned down tip of upper web 43 projects toward base 1.

Figure 9:
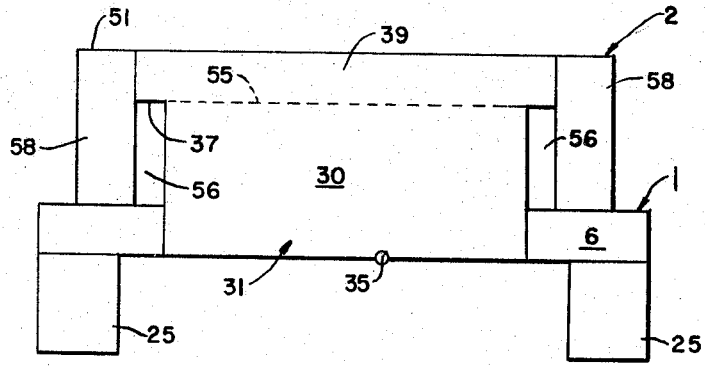
FIGS. 9 and 10 are, respectively, opposite end elevational views of the device of FIG. 1.

As best seen in FIGS. 1, 5 and 9, the intermediate member or programming board 2 is an integrally formed, relatively thick, rectangular plate of electrical insulating material, again advantageously a methyl methacrylate polymer. Member 2 includes a flat upper face 45 which extends throughout the main body portion of the member, and a flat lower face 46 which extends for the full width and most of the length of the member. In plan, member 2 is in the form of an elongated rectangle defined by long sides 47 and 48 and short sides 49 and 50, the former being spaced apart by a distance substantially equal to the length of grooves 10 in base 1.

Adjacent edge 49, member 2 is of greater thickness than in the main body portion defined by surface 45 and includes a portion 51 (FIG. 1) which projects upwardly from surface 45. At its inner side, portion 51 is provided with a groove 52 which extends transversely of member 2 and opens toward the opposite side 50 of the member. Considering base 1 as being horizontal, groove 52 extends horizontally when the device is assembled. Groove 52 is of U-shaped transverse cross section and extends in a straight line, so that the side walls of the groove are parallel to surface 45 while the bottom wall of the groove is at right angles to surface 45. The portion constituting the upper wall of the groove is provided with a centrally disposed projection 53 which extends parallel to surface 45 and is of rectangular plan configuration.

At its side opposite groove 52, the portion 51 is provided with a notch 54 which extends for the full height of portion 51 and is deeper at the top of portion 51 than it is therebelow, so that the notch provides an upwardly facing shoulder 55 which is flat and parallel to surface 45. Notch 54 includes a bottom wall portion 56 which extends downwardly from shoulder 55 and joins the lower surface 46 of member 2 in a right angle corner indicated at 57, FIG. 1. Notch 54 is shorter than the length of sides 49 and 50 and is centered with respect to side 49, so that the ends of the notch are closed by rectangular portions 58, FIGS. 5 and 9. As seen in FIG. 9, the length of notch 54 is just adequate to accommodate the upper portion 39 of latch member 31.

The distance between shoulder 55 and corner 57 is such that the portion of member 2 defined by the surfaces at 55, 56 and the portion of surface 45 immediately below shoulder 55 can be accommodated beneath the shoulder 37 provided by catch member 31, as will be clear from FIG. 1.

At the end of member 2 adjacent side 50, the body of member 2 is cut away to provide a notch 59 which is centered with respect to side 50 and is of a length adequate to just accommodate the stationary catch member 40. As seen in FIG. 1, notch 59 includes a vertical wall 60, spaced from side 50, and a second wall, at right angles to wall 60, this second wall being provided with an upwardly opening groove 61 disposed and dimensioned to accommodate the turned down edge portion of the upper web 43 of catch member 40. The lower surface 46 of member 2 does not extend completely to side 50. Instead, the body of member 2 is cut away to provide an upwardly and outwardly slanting surface portion 62 in the nature of a chamfer or bevel.

At each end of notch 59, there is provided in member 2 an aperture 63, each aperture 63 opening at its upper end through the top face of member 2 and, at its lower end, through the surface 62, the two apertures being identical and of rectangular transverse cross section. At each end of sides 50, member 2 is provided with an upwardly projecting, rectangular ear 64 formed integrally with the body of member 2.

Figure 10:
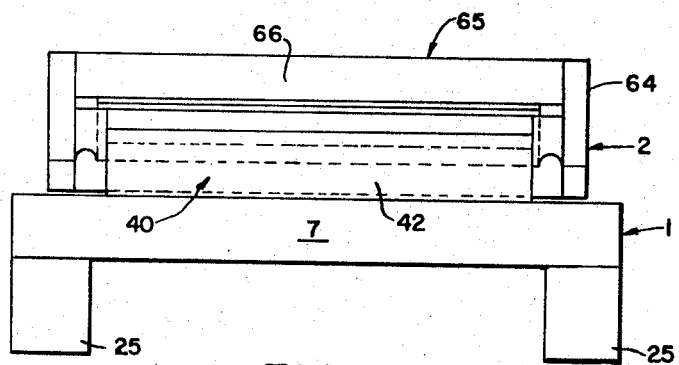

Between ears 64, there is disposed a pivoted catch member 65, FIGS. 5, 6 and 10. Catch member 65 includes an upper elongated portion 66 which is only slightly smaller in length than the space between ears 64, and a pair of legs 67 which depend from the ends of portion 66, each leg 67 being disposed within a different one of the apertures 63. Member 65 is pivotally mounted on member 2, as by a pair of aligned screws 68 each extending through the outer wall of a different one of the apertures 63 and through a cylindrical opening in the corresponding one of the legs 67, the screws 68 having threaded tips engaged in the body of member 2, and plain shaft portions disposed in the openings in the legs. At its top, portion 66 has an overhang 69 which projects toward side 49 of member 2 and provides a downwardly facing shoulder 70. For each leg 67, there is provided a helical compression spring 71 disposed in a suitable opening in the body of member 2 and engaging the lower edge portion of the leg 67 which is directed toward side 49. Springs 71 serve to bias the legs 67 in a counterclockwise direction, as viewed in FIG. 6, to cause edge portions 72 of the legs to engage the adjacent wall of the corresponding aperture 63. Overhang 69 provides an upwardly and outwardly slanting flat cam surface 73.

As seen in FIG. 5, the main body portion of member 2 is provided with a group of one hundred apertures 74 arranged in matrix fashion, there being ten spaced rows of ten such apertures extending parallel to the long sides 47 and 48 of member 2 and ten spaced rows of the apertures extending parallel to short sides 49 and 50. All of the apertures 74 are identical, being generally cylindrical in configuration, with an enlarged upper portion 75 (FIG. 6), opening through surface 45, and a smaller shank portion 76, opening through lower surface 46. In each aperture, the upper and lower portions are joined by an upwardly facing transverse annular shoulder 77, which may be beveled if desired.

Member 2 is also provided with an additional row of ten apertures 78 located in the area of surface 45 adjacent portion 51. Apertures 78 are squally spaced from each other, and from the adjacent apertures 74, the spacing beween apertures 78 being equal to the spacing between apertures 74. Apertures 78 are each identical to apertures 74 in size and configuration.

Member 2 includes two flat, coplanar upper surface portions 79 and 80 which are spaced slightly above the main upper surface 45. Surface portion 79 constitutes the lower side wall of groove 52. Surface portion 80 extends beneath shoulder 70 of catch member 65.

Figure 7:
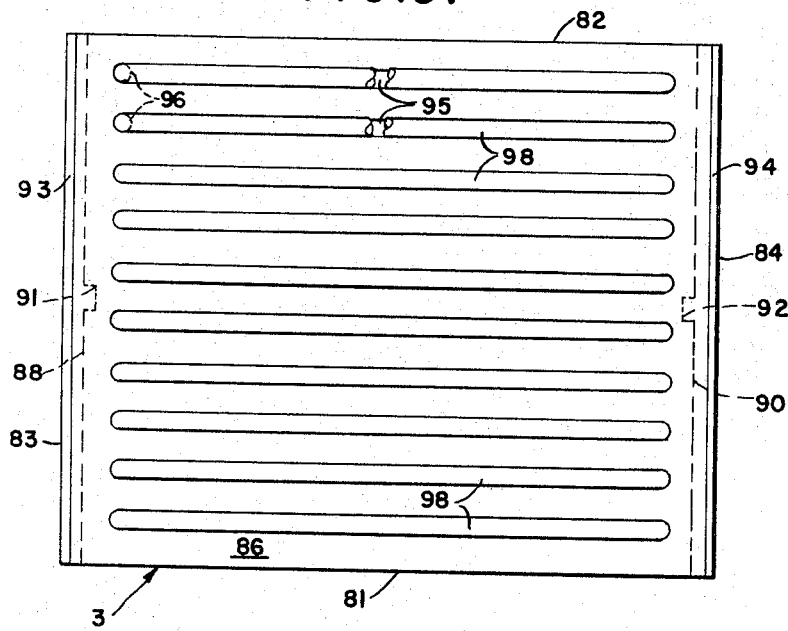
FIG. 7 is a bottom plan view of the upper member of the device of FIG. 1.

Upper member 3 (FIG. 8), is an integrally formed, flat, transparent body of synthetic resinous material such as methyl methacrylate polymer. Rectangular in plan, member 3 has long sides 81 and 82, short sides 83 and 84, a flat upper face 85, and a flat lower face 86. Along side 83, the upper portion of member 3 is cut away for the full length of side 83 to provide a nose portion 87 the upper surface of which is spaced below face 85, there being a shoulder 88 at the root of nose portion 87. At side 84, the upper portion of member 2 is similarly cut away to provide a nose portion 89 and there is a shoulder 90 at the root of nose portion 89. At its center, shoulder 88 is provided with a rectangular centering notch 91 which opens toward side 83, and shoulder 90 is similarly provided with a centering notch 92. As seen in FIGS. 1 and 7, the bottom surface 86 of member 3 is beveled at side 83 to provide an upwardly and outwardly slanting surface 93. A similar bevel is provided adjacent edge 84, providing an upwardly and outwardly slanting surface 94.

At its lower surface 86, member 3 is provided with ten identical, parallel grooves 95 which are parallel to the long sides 81 and 82 of member 3. At each end of each groove 95, there is provided a through bore 96 having an enlarged frusto-conical mouth portion 97 at surface 85. Each groove 95 accommodates a straight, elongated, cylindrical, electrically conductive wire 98, the ends of each wire 98 being bent at right angles to the body of the wire and each disposed in a different one of the corresponding bores 96. The tips of the ends of the wires are deformed transversely, as by a snipping operation, to provide an enlargement 99 in the accommodating mouth 97, so that the portions of the wires disposed in bores 96 are in tension and the main bodies of the wires are thus securely held in grooves 95. At the ends of grooves 95 adjacent side 83 of member 3, all of the bores 96 are aligned in a plane parallel to side 83. Similarly, all of bores 96 at the other ends of the grooves 95 are aligned in a plane parallel to edge 84. The grooves 95 are of such length, and are so positioned, that each groove is capable of overlying all of the apertures 74, plus one of the apertures 78, in a line of such apertures parallel to the long sides 47 and 48 of member 2. If desired, mouth portions 97 may be covered with an insulating tape or otherwise filled with insulating material to prevent contact with the exposed ends 99 of wires 98.

In this embodiment, a plurality of identical interconnecting pins 100 capable of being accommodated in the apertures 74 and 78 are employed. Each connecting pin 100 is in the form of an intertangled body or mass of fine, resilient, electrically conductive wire shaped by compression into a generally cylindrical configuration. The very fine wire constituting the body of each pin 100 can be intertangled in random fashion, or the body can be formed from a mass of knitted wire. Each pin 100 includes a shank portion 101, FIG. 6, of a diameter to fit snugly within the shank portion 76 of one of the apertures, and an enlarged head portion 102 of a diameter to fit snugly within the enlarged top portion 75 of one of the apertures. In relaxed condition, the head portion 102 of each pin 100 is longer than are the enlarged upper portions 75 of the apertures, while the shank portions 101 of the pins are materially longer than the shank portions 76 of the apertures.

Advantageously, the connector pins 100 can be formed from individual right cylindrical blanks of the intertangled wire material, such blanks being placed in a die cavity of the general configuration of the apertures 74, 78, with the axial dimension of the die cavity being materially greater than that of the aperture. The head 102 of the connecting pin is then formed by what is essentially a compression molding operation, with the molding pressure applied axially.

Considering preparation of the device for use, base 1, programming board or intermediate member 2, and upper member 3 are separate from each other, base 1 being mounted on the equipment with which the device is to be used, and suitable connections being made in conventional fashion to the various lead terminals 18 and 24. Conveniently, connector pins 100 can be inserted in all of the apertures 78 in member 2, without regard to the interconnections to be made between the various ones of wires 14 and wires 98. Additional connector pins 100 are inserted in the proper ones of apertures 74, in accordance with the desired interconnections.

Member 3 is now snapped into member 2 by first inserting one of the nose portions 87, 89 into groove 52 in portion 51 of member 2. This is accomplished by holding member 3 at an angle to the plane of member 2, the angle being allowed by the appropriate chamfer or bevel 93, 94, shifting member 3 axially toward portion 51 until the nose portion is disposed in groove 52, and then pivoting the member 3 toward member 2. The corresponding edge 83, 84 accordingly comes into engagement with cam surface 73 of catch member 65, causing that catch member to be pivoted in a clockwise direction, as viewed in FIG. 6, to allow the nose portion to engage beneath shoulder 70. With member 3 so installed, portions of the lower surface 86 thereof adjacent beveled surfaces 93 and 94 are in respective engagement with the surface portions 79 and 80 of member 2.

Member 2 is then manipulated manually to bring groove 61 beneath the upper web 43 of stationary catch member 40. To accomplish this, member 2 is held at such an angle to the upper face of base 1 that the chamfer or beveled surface 62 is parallel to the plane of the base, member 2 then being shifted longitudinally toward the stationary catch members 60 until the downturned edge of web 43 is aligned with groove 61. Member 2 is then pivoted toward the base, shoulder 57 coming into engagement with the cam surface 38 of pivoted catch member 31. Further movement of member 2 toward the base causes catch member 31 to be pivoted in a counterclockwise direction, as viewed in FIG. 1, against the biasing action of spring 33. Finally, member 2 comes to rest in the position seen in FIG. 1, with catch member 31 being returned to its normal position, by the action of spring 33, with shoulder 37 engaged over shoulder 55. Accordingly, member 2 is held in place by stationary catch member 40 and pivoted catch member 31, the lower face 46 of member 2 being in direct engagement with the wires 14 and 23.

Since member 2 directly engages the wires supported by base 1, the catch members employed are effective to maintain base 1, member 2 and member 3 in firm mutual engagement. From FIG. 1, it will be noted that the upper surface 45 of the main body portion of member 2 is spaced below the lower face 86 of member 3 by a distance slightly greater than one half the diameter of wires 98, so that wires 98 are actually spaced slightly above the tops of apertures 74 and 78.

As member 2 reaches the final position seen in FIG. 1, the lower ends of the connecting pins 100 come into engagement with the appropriate ones of wires 14 and 23. At this time, pins 100 are free to shift axially in their accommodating apertures. Accordingly, since the pins are in relaxed condition, and therefore longer than the apertures, the pins project above the open tops of the apertures by a distance which is substantially greater than the ultimate spacing between surface 45 and wires 98. Typically, this distance may be twice the ultimate spacing between surface 45 and wires 98, or even greater. When member 3 is now installed, the wires 98 engage the upper end faces of pins 100, forcing the pins downwardly, so that the pins are all ultimately uniformly compressed, in an axial direction, between the upper surface 8 of base 1 and the lower surface 86 of member 3, with the appropriate ones of wires 14, 23 and 98 impressed into the resilient mass of the corresponding pins. Since each wire 14, 23 and 98 projects from the member which carries it by a distance equal to one half of the diameter of the wire, it follows that one half of the wire will be imbedded in the pin 100 which engages it.

Accordingly, when the device has been assembled in the fashion seen in FIG. 1, those pins 100 which have been installed in the programming board or intermediate member 2 are effective to establish good electrical connections between all of the wires 23 and all of wires 98, and between the selected ones of wires 98 and 14.

It is to be noted that, in assembling the device, members 2 and 3 are snapped into place substantially without relative movement laterally of the connector ends 100. Accordingly, frictional sliding action is substantially minimized. With the device in assembled condition, member 2 cannot be shifted materially in any lateral direction, due to the engagement of the downturned edge of web 43 of stationary catch member 40 in groove 61. Member 3 cannot be shifted longitudinally of the device, since member 3 is held firmly between the bottom wall of groove 52, on the one hand, and the vertical edges of ears 64, on the other hand. Movement of member 2 in a direction parallel to its short sides is prevented by engagement of the downturned edge of web 43 in groove 61, while similar movement of member 3 is prevented by engagement of centering projection 53 in the corresponding one of notches 91 and 92, plus engagement of member 3 with ears 64.

The assembled combination of members 2 and 3 can be removed from the base simply by manually pivoting catch 31 in a counterclockwise direction, as viewed in FIG. 4, and then pivoting the combination of members 2 and 3 until member 2 is disengaged from the stationary catch member 40. Similarly, member 3 can be removed from member 2 by manually pivoting latch member 65 in a clockwise direction, as viewed in FIG. 6, and then pivoting member 3 away from member 2 and withdrawing member 3 from engagement in notch 52.

Figure 12:
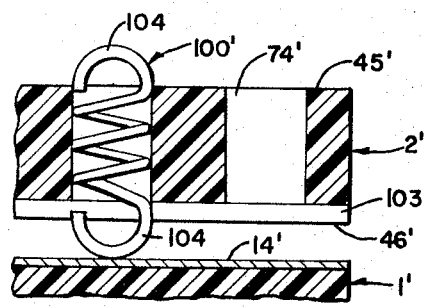
FIG. 12 is a fragmentary sectional view taken on line 12—12, FIG. 11, and illustrating additional parts not seen in FIG. 11.
Figure 16:
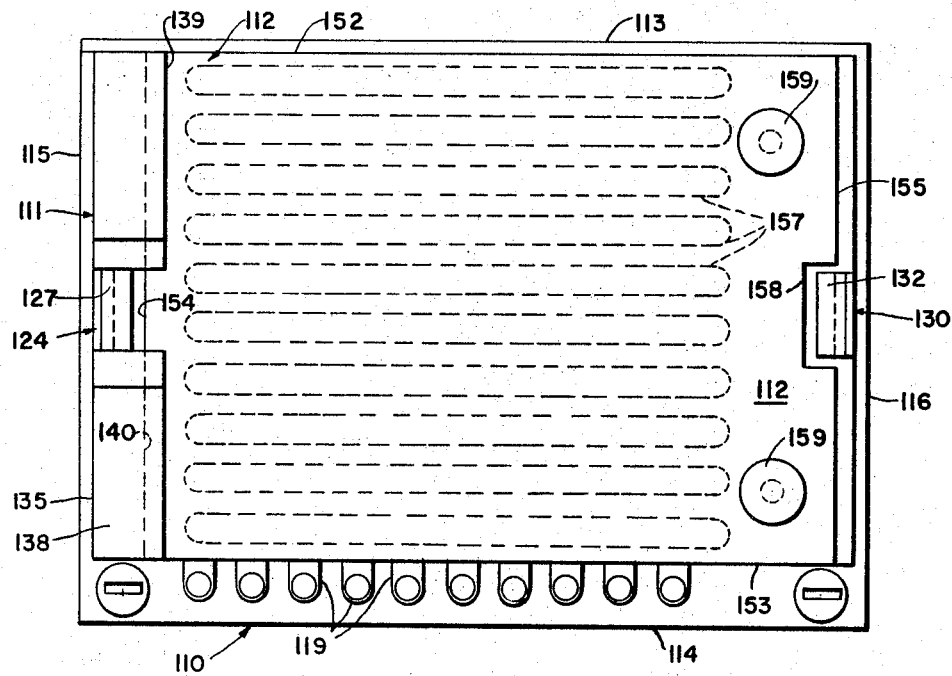
FIG. 16 is a top plan view of the device of FIG. 13.

Though the embodiment of FIGS. 1–10, employing wires of circular transverse cross section as the conductive elements, and the connector pins 100 formed in compressible fashion from an intertangled mass of resilient wire, is particularly advantageous, it may be modified as illustrated in FIGS. 11 and 12. Here, the base member 1' carries printed circuit conductive elements 14', rather than wires. The intermediate member 2' is provided, on its bottom surface, with a plurality of mutually parallel, straight slots 103, the slots being so arranged that each extends in parallel alignment with one of the printed circuit conductive portions 14' when the device is properly assembled. The apertures 74' are of cylindrical configuration, opening through the upper surface 45' of member 2', but stopping short of lower surface 46', in such fashion that all of the apertures 74' in one row are intersected by a slot 103. Each connector pin 100' is in the form of a helical compression spring with hooked ends 104, the ends 104 of each pin lying in a common plane which contains the longitudinal axis of the spring. When the pin 100' is inserted into one of the apertures 74', the spring is rotationally positioned in such fashion that the appropriate hooked end 104 passes through slot 103, so as to be free for direct engagement with the appropriate printed circuit 160 each disposed in a different one of the apertures 148, 149. Pins 160 are identical, being made from a blank of thin beryllium copper or like spring material, a typical blank 161 being illustrated in FIG. 19. The blank includes two greatly elongated rectangular portions 162 and 163 disposed in side-by-side relation, the two portions being formed from the same piece of material and joined in an area indicated at 164, which will be centrally located with respect to the bottom end of the completed connector pin.

Figure 19:
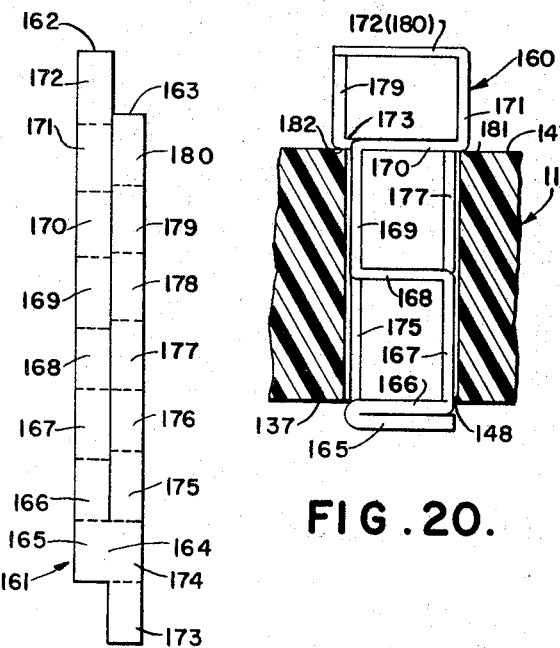
FIG. 19 is a plan view of a sheet metal blank from which a resilient connector pin for the device of FIG. 13 is formed.
Figures 20, 21:
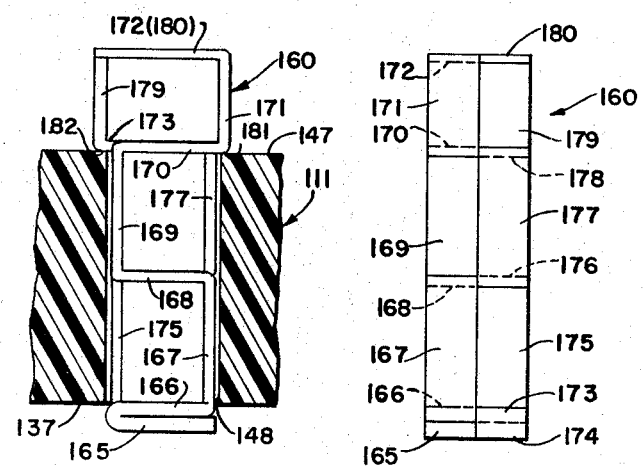
FIGS. 20 and 21 are side elevational views of a connector pin formed from the blank of FIG. 19 and disposed in one of the openings of the intermediate member shown in FIG. 17.

Considering first strip 162, and comparing FIGS. 19, 20 and 21, it will be seen that the strip is bent at a plurality of transverse lines defining portions 165–172, portion 165 being the lowermost portion and portion 172 the uppermost portion. Portion 166 overlies portion 165 and is in face-to-face engagement therewith. Portions 167, 169 and 171 are vertical portions, while portions 168, 170 and 172 extend horizontally, that is, transversely of the completed pin. Strip 163 is similarly bent about transverse lines to provide portions 173–180. Portion 173 is bent to overlie base portion 174 and be in face-to-face contact with the upper surface thereof. Portions 175, 177 and 179 are vertically disposed, extending axially of the pin, while portions 176, 178 and 180 are horizontally disposed, extending transversely of the pin. For each of the strips 162 and 163, there are thus alternate portions extending transversely and axially, the axial portions for each strip being alternately on different sides of the strip, as will be clear from FIG. 20. Further, the relative positions of the two strips are reversed, so that, in any one portion of the connector pin, the vertical part of one strip will be on the opposite side of the pin from the vertical part of the other strip.

The widths of the two strips 162, and the lengths of the transverse or horizontally extending portions 165, 166, 168, 173, 174 and 176 are such that the transverse dimensions of the corresponding part of the completed connector pin will be slightly smaller than the transverse cross section of apertures 148, 149 in intermediate member 111. In this connection, it will be noted that portions 165, 166, 168, 173, 174 and 176 are of equal length, this length being equal to the combined widths of the two strips 162 and 163. Accordingly, the lower portion of the completed connector pin has an essentially square transverse cross section.

Portions 170, 172, 178 and 180, all located in the upper portion of the finished connector pin, are materially longer than transverse portions in the lower part of the connector pin. Accordingly, as will be clear from FIG. 20, portion 170 projects beyond the common plane occupied by vertical portions 167 and 177, providing a shoulder at 181 for engagement with the upper surface 147 of member 111. Similarly, portion 178 projects beyond the common plane occupied by portions 169 and 175, providing a shoulder 182 for engagement with surface 147. The normal or relaxed length of each connector pin 160 is such that, when the pin is inserted in one of the apertures 148, 149 and shoulders 181 and 182 are seated on surface 147, the lower tip of the connector pin, defined by portions 165 and 174, will project well below the lower surface 137 of member 111, as seen in FIG. 20. Assuming that member 111 has been removed from the assembly, and that pins 160 have been inserted therein, all of the transverse portions, such as portions 165 and 172, can be considered as lying essentially at right angles to the axially extending portions, such as portions 166 and 171.

Since, when the pins 160 are in their normal or relaxed conditions, the space between the lower surfaces of portions 165 and 174 and the upper surfaces of portions 172 and 180 is materially greater than the space between the exposed faces of conductive strips 119 and the exposed faces of conductive strips 157, in the assembled device, it will be clear that, once the device is assembled, any of the pins 160 which have been inserted in member 111 will be held under axial compression, with the lower surfaces of portions 165 and 174 in flush engagement with conductive strips 119 and the upper surfaces of portions 172 and 180 in flush engagement with conductive strips 157. In essence, such compression of the connector pins causes the angles between the transverse portions and the longitudinal portions to become acute, rather than right angles. Thus, for example, when the pin 160 seen in FIG. 20 is axially compressed, it can be considered that portion 167 will be shifted upwardly, as viewed, and portion 169 shifted downwardly, so that the transverse portion 168 slants downwardly from right to left, as viewed. In the preferred form of the device, all of the compressive axial force applied to the pin is assumed by the type of distortion just mentioned, so that it is unnecessary to have any of the axially extending portions of the pin be under such compressive stress as would tend to materially bow the same.

The connector pins described with reference to FIGS. 19 and 21 have the distinct advantage of presenting relatively broad, flat contact surfaces for engagement with the cooperating conductive strips 119, 157, thus assuring good electrical contact of relatively low resistance. It will be noted that, when flat conductive strips are employed on the base and upper member, as in the present embodiment, there is no distortion of the flat end surfaces presented by the contact pin. Accordingly, the problem of unpredictable non-uniformity of contact engagement is completely avoided in this embodiment.

Though particularly advantageous embodiments of the invention have been chosen for illustrative purposes, it will be understood by those skilled in the art that various changes and modifications can be made therein without departing from the scope of the invention as defined in the appended claims.

I claim:
1. In an electrical interconnecting device of the type described, the combination of
    a base member of insulating material having a top surface;
    a first group of elongated electrically conductive elements secured to said base member and disposed in spaced mutually parallel relation,
        said conductive elements being exposed at said top surface,
        the mutually parallel disposition of said conductive elements establishing a first axis;
    first and second catch members mounted on said base member and projecting thereabove,
        at least one of said catch members being movable relative to said base member between an active position and an inactive position,
        said catch members being spaced from each other across the portion of said top surface occupied by said conductive elements;
    an intermediate member of insulating material, said intermediate member having
        a main body portion of substantial thickness, and
        first and second side portions spaced from each other across said main body portion by a distance such that said first and second side portions can be engaged respectively with said first and second catch members to removably retain said intermediate member on said base member;
    a third catch member carried by said intermediate member at one side of said main body portion;
    an upper member of insulating material, said upper member having
        a main body portion presenting a bottom surface, and
        first and second side portions spaced apart across said bottom surface, one of said side portions being removably engageable with said third catch member;

portion 14'. The opposite end 104 of the spring is disposed to be engaged by a similar printed circuit portion (not shown) on the upper member. As in the embodiment previously discussed with reference to FIGS. 1–10, the connector pin is held in compression between the base and the upper member.

FIGS. 13–21 illustrate another embodiment of the invention. Here, the device includes a base member 110, a programming board or intermediate member 111 and an upper member 112. Base member 110 is in the form of a flat, rigid plate of insulating material, the plate being rectangular in plan and having long sides 113 and 114 and short sides 115 and 116. Standoff insulators 117 are provided, by which the base member can be affixed to a part of the equipment with which the device is to be used. On its upper surface 118, member 110 is provided with ten mutually parallel elongated conductive strips 119 which are spaced equally from each other and extend parallel to the short sides 115, 116. Adjacent side 114, the conductive strips are provided at their ends with connection terminals 120 in the nature of pins which extend through base member 110 and project from the lower surface 121 thereof. The conductive strips 119 can be provided as printed circuit elements or established on the upper face of member 110 in any other conventional fashion.

The group of conductive elements constituted by strips 119 is offset from the center of member 110 toward edge 115. In the space between the conductive strips 119 and edge 116, there are provided short conductive strips 122 which extend parallel to the long sides 113, 114 and, at their ends adjacent side 116, are connected to terminal pins 123 which project from the lower surface 121 of base 110.

Adjacent short side 115, there is secure to the upper face of base 110 a pivoted catch member 124. Member 124 includes a shank 125 and an enlarged tip providing a donwwardly facing shoulder 126 and an upwardly and outwardly slanting cam face 127. The lower end of shank 125 is disposed between the legs of a generally U-shaped mounting block 128 secured to base 1, as by screws 129. The shank 125 of the catch member is pivotally supported by a suitable shaft (not shown) extending horizontally through the legs of mounting block 128 parallel to the short side 115, a torsion spring (not shown) being provided in the same general fashion hereinbefore described with reference to spring 33, FIG. 4, in order to bias the catch member 124 pivotally toward short side 116.

Base member 110 also carrries a second pivoted catch member 130 which is identical with catch member 124. Catch member 130 includes a downwardly facing shoulder 131 and an upwardly and outwardly slanting cam surface 132. Catch member 130 is mounted for pivotal movement about an axis parallel to side 116 and is resiliently biased in a direction tending to pivot the member toward side 115.

The programming board or intermediate member 111 is in the form of an integral body of electrically insulating material and is generally rectangular in plan, including long sides 133 and 134, and short sides 135 and 136. The lower surface 137 of member 111 is flat and extends throughout the entire length and width of member 111. Adjacent the lower surface thereof, the body of member 111 is cut away at the corners to accommodate the mounting screws for the standoff insulator 117. Also, downwardly opening notches of suitable size and configuration are provided to accommodate the mounting block which supports catch members 124 and 130.

Adjacent short side 135, member 111 includes a relatively thick, upwardly projecting portion 138 defined on one side by short side 135 and on the other side by a surface 139 which extends parallel to side 135 and is provided with an inwardly opening groove 140 extending for the full width of member 111. Side 135 is provided with a notch 141 to accommodate the shank of pivoted catch member 124. In the same location, the top of portion 138 is notched to provide a horizontal surface 142 to cooperate with shoulder 126 of catch member 124.

Figure 13:
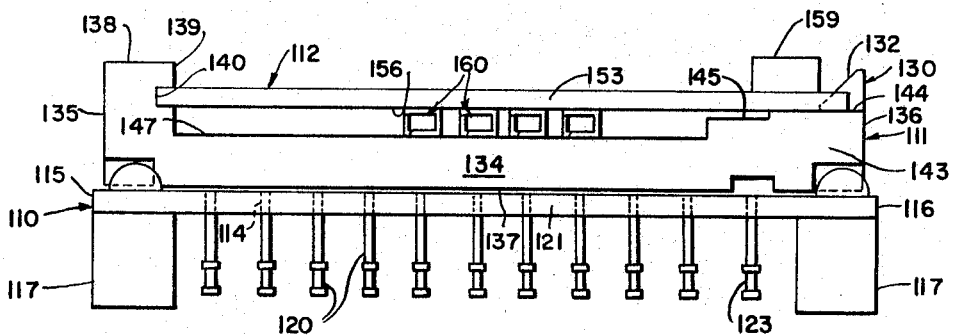
FIG. 13 is a side elevational view of a cross-connecting matrix pinboard device in accordance with another embodiment of the invention.
Figure 14:
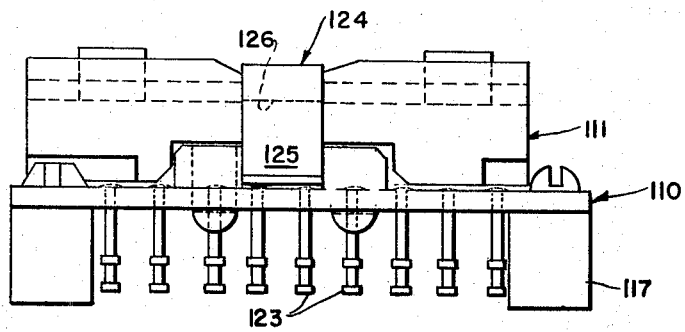
FIGS. 14 and 15 are, respectively, opposite end elevational views of the device of FIG. 13.
Figure 15:
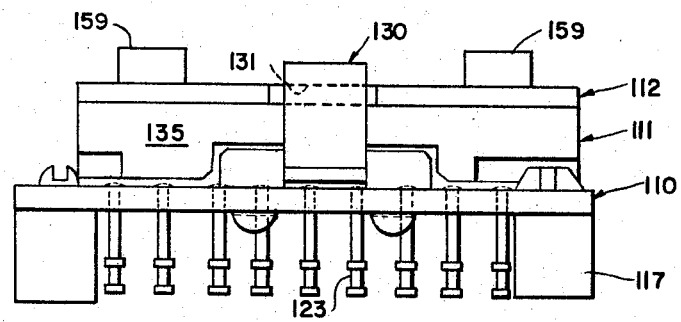
Figure 17:
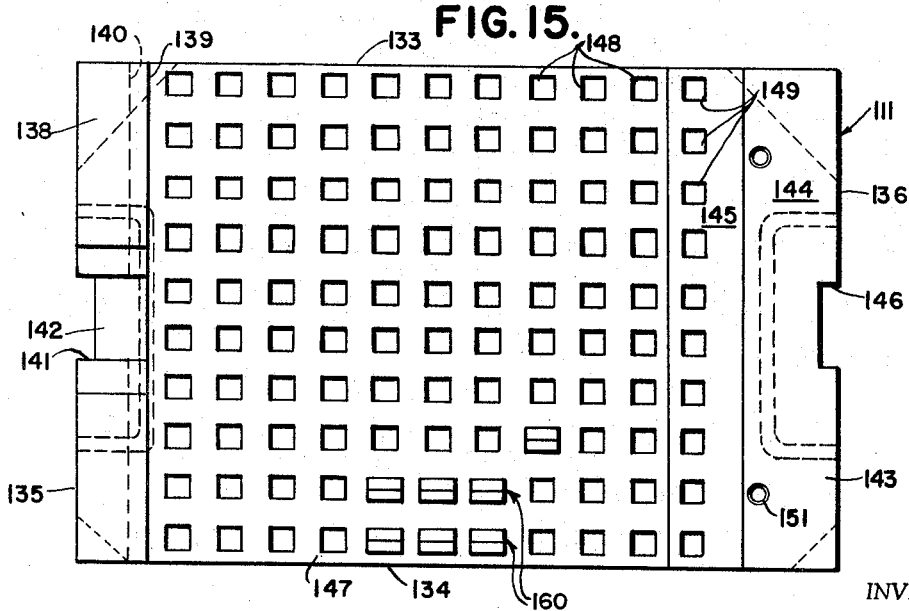
FIG. 17 is a top plan view of the intermediate member of the device of FIG. 13.
Figure 18:
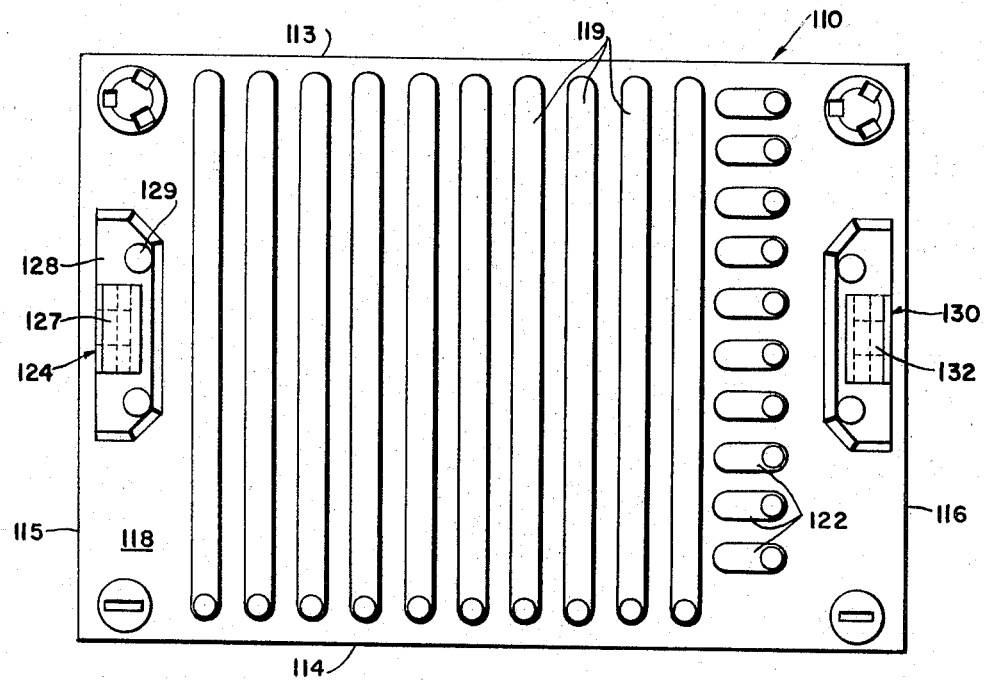
FIG. 18 is a top plan view of the base member of the device of FIG. 13.

Adjacent side 136, member 111 has a thickened, upwardly projecting portion 143, FIG. 13, presenting a higher top surface portion 144 and a second top surface portion 145 spaced slightly therebelow, surface portion 143 lying in the same plane as the bottom wall of groove 140. Side 136 is provided with a notch 146 to accommodate the shank of pivoted catch member 130. Surface portion 144 is disposed to cooperate with the shoulder 131 of catch member 130.

Between thickened portions 138 and 143, member 111 presents a flat upper surface 147. In this area of member 111, there are provided a plurality of apertures 148 arranged in spaced rows extending parallel to the short sides 135 and 136 of member 111, the spacing between the ten rows of apertures being equal to the spacing between the conductive strips 119. Apertures 148 are identical, each being of square transverse cross section and uniform throughout its length, opening both through lower surface 137 and upper surface 147. For purposes of illustration, 100 apertures 148 arranged in ten spaced rows are shown, but it is understood that more or less than 100 apertures may be provided, as desired.

In the area of member 111 defined by upper surface portion 145, there are provided ten apertures 149 spaced equally in a row parallel to the short sides 135, 136, the spacing between apertures 149 being equal to the spacing between apertures 148. Apertures 149 are each identical to apertures 148.

In the area defined by surface portion 144, member 111 is provided with two upwardly facing, internally threaded bores 151 which extend at right angles to surface 144.

Upper member 112 is in the form of a rigid rectangular plate of insulating material having long sides 152 and 153 and short sides 154 and 155. The flat lower surface 156 of member 112 is provided with ten elongated electrically conductive strips 157 which are equally spaced, mutually parallel, and extend parallel to the long sides 152 and 153 of member 112. Strips 157 are spaced apart by distances equal to the spacing between apertures 148. The electrically conductive strips 157 can be established by printed circuit procedures of any other suitable method.

Short side 154 of member 112 is straight and uninterrupted, the thickness of member 112 being such that the portion thereof adjacent side 154 can be accommodated snugly within groove 140. Short side 155 is interrupted by a notch 158 of adequate size to freely accommodate the upper portion of pivoted catch member 130. Member 112 is provided with openings to accommodate the shanks of fastening screws 159, the screws being so located as to allow threaded engagement of the tips thereof with bores 151 when the side portion of member 112 at 155 is properly engaged in groove 140.

Since electrically conductive strips 157 extend parallel to the long sides 152 and 153 of member 112, and since that member is installed with its short sides parallel to the short sides of base 110, the electrically conductive strips 157 extend across strips 119 on the base at right angles, each strip 157 crossing all of the strips 119. Thus, the two groups of conductive strips are arranged to form a matrix, with strips 119 defining the X axis and strips 157 defining the Y axis. Apertures 148 are so arranged that each aperture is located at a different one of the points of crossing of strips 119 and 157. In this embodiment, engagement of the catch members 124, 130 respectively in notches 141 and 146 serves to maintain the intermediate member 111 in properly oriented position with respect to base 110, while the screws 159 fix the upper member 112 in proper relation to the intermediate member.

Interconnection between the conductive strips 119 and 157, and between strips 157 and the short strips 122, is accomplished by means of a plurality of connector pins a second group of elongated electrically conductive elements secured to said upper member and disposed in spaced mutually parallel relation,
	said second group of conductive elements being exposed at said bottom surface,
		the mutually parallel disposition of the conductive elements of said second group establishing a second axis which extends at right angles to said first axis when said one side portion of said upper member is engaged with said third catch member;
said main body portion of said intermediate member being provided with a plurality of apertures each located at a different one of the points at which the various ones of the conductive elements of said first group cross beneath different ones of the conductive elements of said second group when said intermediate and upper elements are engaged respectively with said catch members;
a plurality of axially compressible electrically conductive connector pins each disposable in one of said apertures,
	each of said pins having a relaxed length such that, when the pin is disposed in one of said apertures and said intermediate and upper members are respectively engaged with said catch members, the pin will be axially compressed by reason of engagement of its ends with the respective ones of said conductive elements; and
releasable fastener means for securing the other of said side portions of said upper member to said intermediate member.

2. A device in accordance with claim 1 and further comprising
	a third group of electrically conductive elements secured to said base member and exposed at said top surface thereof beside said first group of conductive elements,
		the conductive elements of said third group being equal in number to the conductive elements of said second group and spaced apart along a line parallel to said second axis in such fashion that, when said intermediate and upper members are respectively engaged with said catch members, each conductive element of said third group underlies a portion of a different one of the conductive elements of said second group,
		said intermediate member having a plurality of apertures disposed to register respectively each with a different one of the conductive elements of said third group to accommodate connector pins for establishing connections between the conductive elements of said third group and the corresponding conductive elements of said second group, and
a plurality of leads each connected to a different one of the conductive elements of said third group.

3. A device in accordance with claim 2 and wherein said leads are carried by said base member,
the device further comprising
additional leads carried by said base member and each connected to a different one of the conductive elements of said first group.

4. A device in accordance with claim 1 and wherein one of said first and second catch members is rigidly mounted on said base member and includes a stationary, downwardly facing shoulder,
the other of said first and second catch members is mounted on said base member for pivotal movement about an axis at right angles to the direction of spacing between said first and second catch members, said other catch member comprising
	a downwardly facing shoulder, and
	an upwardly and outwardly slanting cam surface,
said first and second side portions of said intermediate member being spaced apart by a distance such that, when one of said side portions is engaged beneath said stationary shoulder of said rigidly mounted catch member, downward swinging movement of said intermediate member will cause the other of said side portions first to engage said cam surface to pivot said pivotally mounted catch member to an inactive position and then to be engaged beneath said downwardly facing shoulder of said pivotally mounted catch member when the latter is returned to its active position,
the device further comprising
resilient means biasing said pivotally mounted catch member to its active position.

5. A device in accordance with claim 1 and wherein both of said first and second catch members are mounted on said base member for pivotal movement, axes of pivotal movement of said first and second catch members being parallel, said first and second catch members each comprising
	a shoulder directed toward said base, and
	an upwardly and outwardly slanting cam surface,
		said first and second catch members each being pivotable between an outer inactive position and an inner active position,
the device further comprising
resilient means biasing each of said first and second catch members to its active position,
the dimensions of said intermediate member being such that, when said intermediate member is generally centered over said base member, movement of said intermediate member toward said base member will cause said side portions of said intermediate member each to engage a different one of said cam surfaces, whereby said first and second catch members are caused to pivot outwardly to allow said side portions to engage respectively beneath said shoulders.

6. A device in accordance with claim 1 and wherein the dimensions of said first and second catch members are such that, when said intermediate member is disposed with said side portions engaged with said catch members, the bottom surface of said main body portion of said intermediate member is disposed in engagement with said first group of conductive elements.

7. A device in accordance with claim 6 and wherein said second group of conductive elements is spaced above the upper surface of said main body portion of said intermediate member when said upper member is secured to said intermediate member by said third catch member and said fastener means,
said connector pins each include an enlarged, axially compressible head portion adapted to be engaged in compression between the conductive elements of said second group and said main body portion of said intermediate member.

8. A device in accordance with claim 7 and wherein each of said apertures comprises a lower portion of smaller transverse dimension and an upper portion of larger transverse dimension, said aperture portions joining each other at a transverse upwardly directed shoulder upon which the enlarged head portion of one of said connector pins can seat.

9. A device in accordance with claim 1 and wherein said upper member is transparent.

10. A device in accordance with claim 9 and wherein said intermediate member is transparent.

11. In an electrical interconnecting device of the type described, the combination of
a rigid base member of insulating material;
a rigid intermediate member of insulating material;
a rigid upper member of insulating material;
a first group of elongated electrically conductive elements secured to said base member and exposed at the upper surface thereof, the conductive elements of said first group being mutually parallel and spaced apart;
a second group of elongated electrically conductive elements secured to said upper member and exposed at the lower face thereof,
the conductive elements of said first group being mutually parallel and spaced apart;
a fastener means releasably securing said rigid members together with said intermediate member disposed between said base member and said upper member and the conductive elements of said first group extending at right angles to the conductive elements of said second group,
the location of said groups being such that, when said rigid members are secured together by said fastener means, each conductive element of each of said group crosses the conductive elements of the other of said groups,
the upper face of said intermediate member being spaced from the conductive elements of said second group when said rigid members are secured together by said fastener means,
said intermediate member being provided with a plurality of spaced, mutually parallel, cylindrical bores extending at right angles to the planes in which said conductive elements are disposed when said rigid elements are secured together by said fastener means, said bores each being located at a different one of the points where the conductive elements of said first group cross the conductive elements of said second group; and
a plurality of axially compressible electrically conductive connector pins each disposable in one of said bores to establish an electrical connection between the corresponding ones of said conductive elements, each of said pins each comprising
a generally cylindrical, resiliently deformable mass of fine intertwined wire having at least generally flat ends for engagement with said conductive elements,
each pin including an enlarged head portion, engageable between the conductive elements of said second group and said intermediate body, and a shank portion of smaller diameter than said head portion.

12. A device in accordance with claim 11 and wherein the generally cylindrical mass of each of said pins is shaped by compression, and
each of said head portions is more highly compressed than the corresponding shank portion.

13. A device in accordance with claim 11 and wherein each of said bores includes an upper portion of larger diameter and a lower portion of smaller diameter, said portions joining at a transverse upwardly facing shoulder adapted to engage beneath the head portion of one of said connector pins.

14. In an electrical interconnecting device of the type described, the combination of
a rigid base member of electrical insulating material;
a rigid intermediate member of electrical insulating material;
a rigid upper member of electrical insulating material;
a first group of elongated electrically conductive elements secured to said base member and exposed at the upper surface thereof,
the conductive elements of said first group being mutually parallel and spaced apart;
a second group of elongated electrically conductive elements secured to said upper member and exposed at the lower surface thereof,
the conductive elements of said second group being mutually parallel and spaced apart;
releaseable fastener means for securing said rigid members together with said intermediate member disposed between said base member and said upper member and the conductive elements of said first group extending at right angles to the conductive elements of said second group,
said groups of conductive elements being so located on said base member and said upper member, respectively, that, when said rigid members are secured together by said fastener means, each conductive element of said first group crosses beneath all of the conductive elements of said second group;
said intermediate member being provided at its lower surface with a plurality of mutually parallel downwardly opening spaced slots,
the spacing between said slots, said conductive elements of said first group, and said conductive elements of said second group all being equal,
said slots being parallel to the conductive elements of one of said groups when said rigid members are secured together by said fastener means,
said intermediate member also being provided with a plurality of bores each opening through the upper surface of said intermediate member and terminating short of the lower surface thereof, each of said bores communicating with one of said slots; and
a plurality of connector pins each comprising
a helical spring having at each end a hooked portion lying in a plane including the longitudinal axis of the helical spring, the curve of each of said hooked end portions opening toward the body of the helical spring,
each of said connector pins being insertable into one of said bores with one of said hooked ends then projecting through the corresponding one of said slots,
the relaxed lengths of said connector pins being greater than the space between said groups of conductive elements when said rigid members are secured together by said fastener means.

References Cited

UNITED STATES PATENTS

| | | | |
|---|---|---|---|
| 2,006,436 | 7/1935 | Bowers | 339—18 |
| 2,400,647 | 5/1946 | Kohring | 339—221 |
| 2,437,018 | 3/1948 | Dodson | 339—18 |
| 2,922,135 | 1/1960 | Hoberg et al. | 339—18 |
| 3,158,419 | 11/1964 | Meyer et al. | 339—18 |

MARVIN A. CHAMPION, *Primary Examiner.*

EDWARD C. ALLEN, PATRICK A. CLIFFORD,
*Examiners.*